(12) United States Patent
Taniguchi et al.

(10) Patent No.: US 10,054,164 B2
(45) Date of Patent: Aug. 21, 2018

(54) ROLLING BEARING

(71) Applicant: JTEKT CORPORATION, Osaka-shi, Osaka (JP)

(72) Inventors: Youzou Taniguchi, Toyota (JP); Yasuhiko Ishii, Kashiwara (JP); Takashi Iwata, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 17 days.

(21) Appl. No.: 15/347,513

(22) Filed: Nov. 9, 2016

(65) Prior Publication Data

US 2017/0138404 A1 May 18, 2017

(30) Foreign Application Priority Data

Nov. 16, 2015 (JP) .................................. 2015-224102

(51) Int. Cl.
| | |
|---|---|
| *F16C 33/58* | (2006.01) |
| *F16C 35/04* | (2006.01) |
| *F16C 19/16* | (2006.01) |
| *F16C 35/067* | (2006.01) |

(52) U.S. Cl.
CPC ............ *F16C 35/042* (2013.01); *F16C 19/16* (2013.01); *F16C 33/583* (2013.01); *F16C 33/585* (2013.01); *F16C 33/586* (2013.01); *F16C 35/067* (2013.01); *F16C 2220/70* (2013.01); *F16C 2240/30* (2013.01); *F16C 2240/42* (2013.01)

(58) Field of Classification Search
CPC ............................. F16C 33/583; F16C 33/586
See application file for complete search history.

(56) References Cited

U.S. PATENT DOCUMENTS

| | | | | |
|---|---|---|---|---|
| 3,588,205 A | * | 6/1971 | Daugherty | .............. F16C 27/04 384/473 |
| 3,619,017 A | * | 11/1971 | Robinson | .............. F16C 19/163 384/513 |
| 4,509,871 A | * | 4/1985 | Herzog | ................. F16C 19/166 384/502 |
| 4,548,518 A | * | 10/1985 | Ravinale | .................. D01H 7/56 384/469 |

(Continued)

FOREIGN PATENT DOCUMENTS

| | | | |
|---|---|---|---|
| FR | 3020420 B1 * | 2/2017 | ............ F16C 35/063 |
| JP | H10-37967 A | 2/1998 | |
| JP | 2006-322579 A | 11/2006 | |

OTHER PUBLICATIONS

U.S. Appl. No. 15/347,363, filed Nov. 9, 2016 in the name of Youzou Taniguchi.
Feb. 12, 2018 Office Action issued in U.S. Appl. No. 15/347,363.

*Primary Examiner* — Thomas R Hannon
(74) *Attorney, Agent, or Firm* — Oliff PLC (57) ABSTRACT

A rolling bearing includes an inner ring, an outer ring, a plurality of balls, and a cage that holds the balls. An annular groove for creep suppression is formed in a fitting surface that is fitted on a housing to which an outer ring is attached. The annular groove has a depth at which a groove bottom portion of the annular groove is precluded from coming into contact with the mating member when a static load rating is imposed on the annular groove in a radial direction.

2 Claims, 8 Drawing Sheets

(56) References Cited

U.S. PATENT DOCUMENTS

| | | | | |
|---|---|---|---|---|
| 5,310,268 A | * | 5/1994 | Schlereth | F16C 19/184 |
| | | | | 384/512 |
| 8,596,876 B2 | * | 12/2013 | Olschewski | F16C 19/28 |
| | | | | 384/569 |
| 2010/0158424 A1 | * | 6/2010 | Muramatsu | F16C 35/067 |
| | | | | 384/548 |

* cited by examiner

ROLLING BEARING

INCORPORATION BY REFERENCE

The disclosure of Japanese Patent Application No. 2015-224102 filed on Nov. 16, 2015 including the specification, drawings and abstract, is incorporated herein by reference in its entirety.

BACKGROUND OF THE INVENTION

1. Field of the Invention

The invention relates to a rolling bearing.

2. Description of the Related Art

Figure 8:
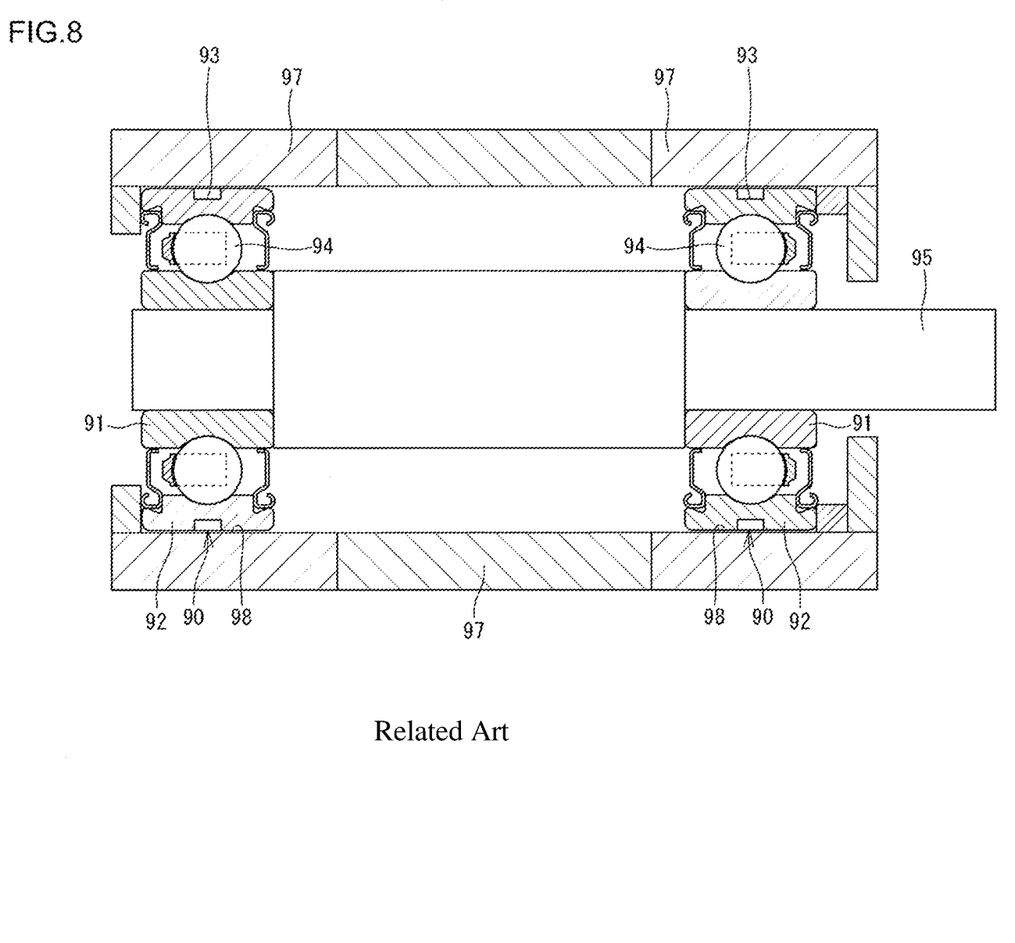
FIG. 8 is a sectional view illustrating a conventional rolling bearing.

Many rolling bearings are used for various types of industrial equipment. A rolling bearing includes an inner ring, an outer ring, a plurality of rolling elements, and a cage. The rolling elements are interposed between the inner ring and the outer ring. The cage holds the rolling elements. For example, in each rolling bearing 90 that supports a rotating shaft 95 in a housing 97, an inner ring 91 is fitted over and attached to the rotating shaft 95, and an outer ring 92 is attached to an inner peripheral surface 98 of the housing 97, as depicted in FIG. 8.

In particular, when the rolling bearing 90 is a deep groove ball bearing and is subjected to an axial load in one direction, the inner ring 91 and the rotating shaft 95 are assembled in a "interference fit" state. In contrast, the outer ring 92 and the housing 97 are often assembled in a "clearance fit" state. Thus, in a use state where the rotating shaft 95 is rotating, creep (slip of the outer ring 92 with respect to the housing 97 in a circumferential direction) is likely to occur between the outer ring 92 and the housing 97.

Thus, a rolling bearing has been proposed in which a groove (annular groove) is formed in an outer peripheral surface of the outer ring 92 to suppress possible creep (see Japanese Patent Application Publication No. 2006-322579 (JP 2006-322579 A) or Japanese Patent Application Publication No. H10-37967 (JP H10-37967 A)). This rolling bearing enables suppression of creep that is likely to occur when a heavy load is imposed on the bearing in a radial direction. The creep that is likely to occur when such a load is imposed on the bearing causes the outer ring 92 to slip slowly in the same direction as a rotating direction of the bearing.

The annular groove 93 formed in the outer peripheral surface of the outer ring 92 enables the creep as described above to be suppressed. However, JP 2006-322579 A further discloses a configuration concerning the depth of the annular groove 93. In the configuration disclosed, when balls (rolling elements) 94 roll in pressure contact with an outer-ring raceway surface to cause radial deformation of an area of the outer ring 92 where the annular groove 93 is formed, a part (the bottom of the groove) of the area comes into contact with and is received by the inner peripheral surface 98 of the housing 97. Thus, in the related art, the depth of the annular groove 93 is set such that, during actual use, the deformed portion (groove bottom portion) of the annular groove 93 can come into contact with the housing 97.

However, the inventors further studied an annular groove for creep suppression, which is formed in a fixed ring, to find the following. Even with an annular groove formed in the outer ring, when the groove bottom portion is elastically deformed to come into contact with a mating member, creep may occur depending on a change (pulsation) in the state of the contact.

SUMMARY OF THE INVENTION

An object of the invention is to provide a rolling bearing that enables possible creep to be effectively suppressed.

A rolling bearing in an aspect of the invention includes an inner ring, an outer ring, a plurality of rolling elements interposed between the inner ring and the outer ring, and a cage that holds the rolling elements. One of the inner ring and the outer ring is a rotating ring, and the other is a fixed ring. An annular groove for creep suppression is formed in a fitting surface of the rolling bearing that is fitted on a mating member to which the fixed ring is attached. The annular groove has a depth at which a groove bottom portion of the annular groove does not come into contact with the mating member when a static load rating is imposed on the annular groove in a radial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
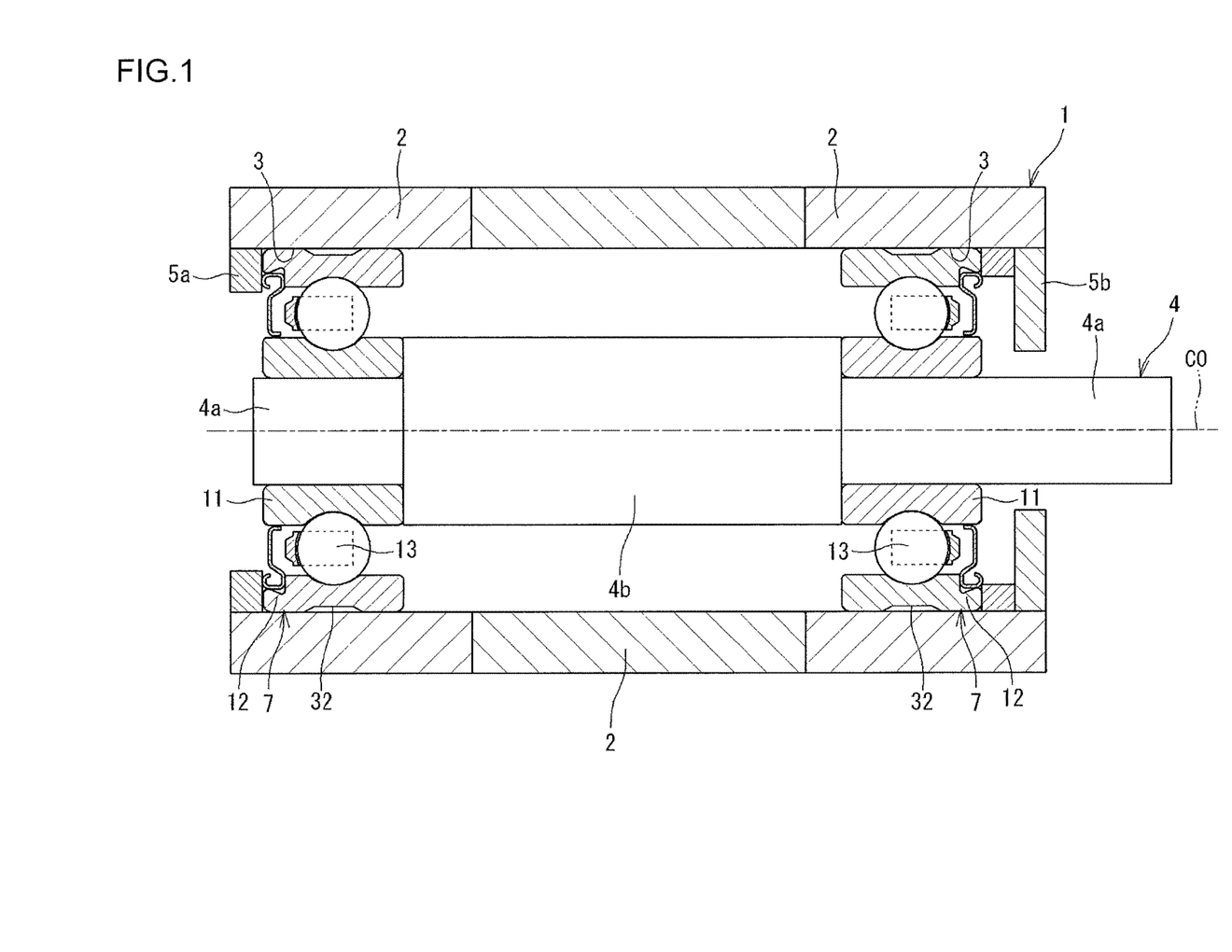
FIG. 1 is a longitudinal sectional view depicting an embodiment of a rotating apparatus including a rolling bearing in the invention.

Embodiments of the invention will be described based on the drawings. FIG. 1 is a longitudinal sectional view depicting an embodiment of a rotating apparatus 1 including a rolling bearing 7 in the invention. The rotating apparatus 1 has a housing 2 and a rotating shaft 4. The rotating shaft 4 is rotatably supported in the housing 2 by a pair of rolling bearings 7, 7. The rotating shaft 4 has small-diameter shaft portions 4a, 4a and a large-diameter shaft portion 4b. The rolling bearings 7, 7 are attached to the respective small-diameter shaft portions 4a, 4a. The large-diameter shaft portion 4b is interposed between the rolling bearings 7, 7 (inner rings 11, 11) and is larger in outside diameter than the small-diameter shaft portion 4a.

Annular portions 5a, 5b are provided on opposite sides of an inner peripheral surface 3 of the housing 2 (also referred to as a housing inner peripheral surface 3) in an axial direction. The rolling bearings 7, 7 are bearings for motors to which a preload is applied. The rolling bearings 7, 7 are subjected to a load (preload) in one direction along an axial direction.

The rolling bearing 7 on one side (in FIG. 1, a right side) in the axial direction has the same configuration as that of the rolling bearing 7 on the other side (in FIG. 1, a left side) in the axial direction. As a representative, the rolling bearing 7 on one side (in FIG. 1, the right side) in the axial direction will be described in detail in terms of configuration.

Figure 2:
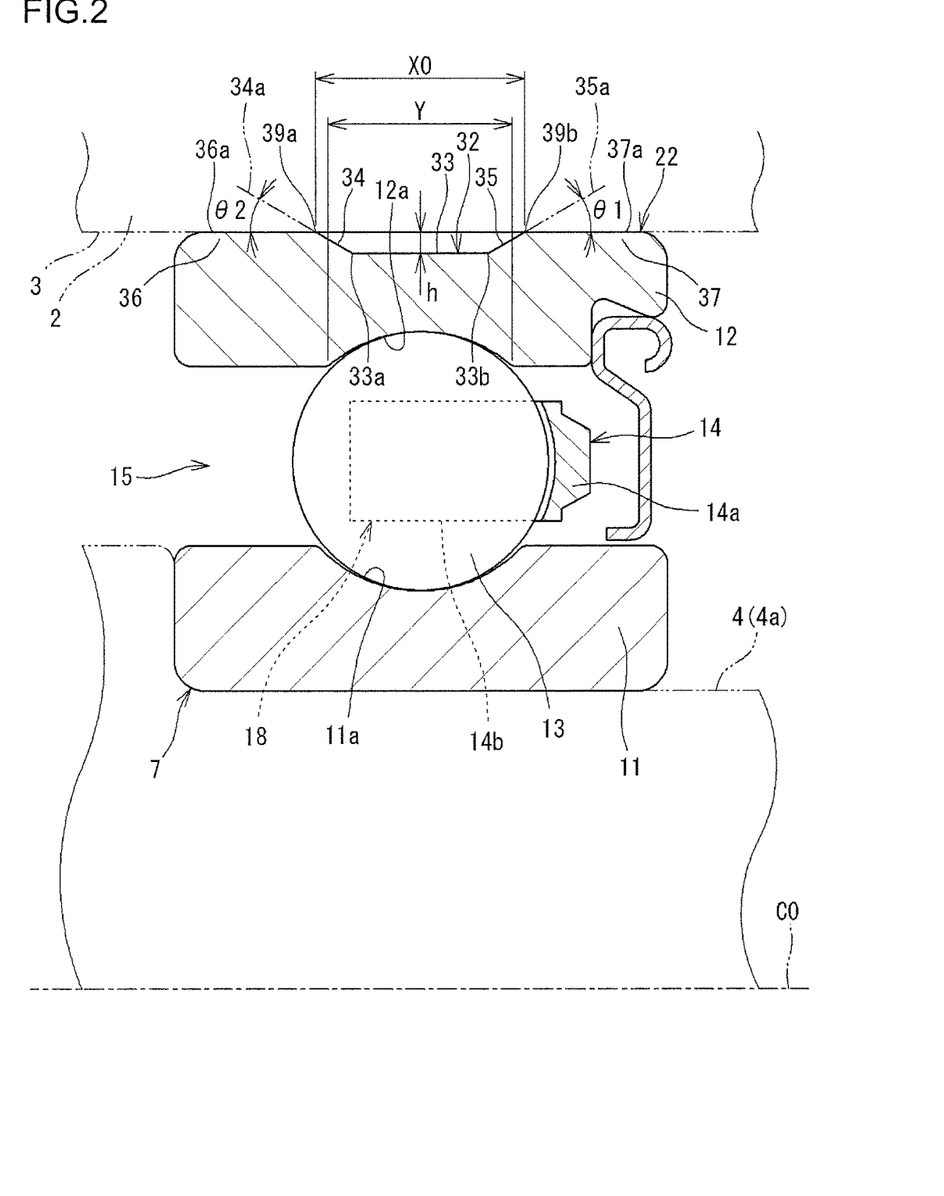
FIG. 2 is a sectional view of the rolling bearing.

FIG. 2 is a sectional view of the rolling bearing 7. The rolling bearing 7 includes an inner ring 11, an outer ring 12, a plurality of rolling elements, and an annular cage 14. The inner ring 11 is externally fitted over and attached to the rotating shaft 4. The outer ring 12 is attached to the housing inner peripheral surface 3. The rolling elements are interposed between the inner ring 11 and the outer ring 12. The cage 14 holds the rolling elements. The rolling elements in the present embodiment are balls 13, and the rolling bearing 7 depicted in FIG. 2 is a deep groove ball bearing. As described above, a load is imposed on the rolling bearing 7 in one direction along the axial direction.

In the present embodiment, the inner ring 11 and the rotating shaft 4 are assembled in an "interference fit" state. The inner ring 11 is closely fitted over the rotating shaft 4 so as to be rotatable integrally with the rotating shaft 4. In contrast, the outer ring 12 is attached to the fixed housing 2. The outer ring 12 is assembled on the housing inner peripheral surface 3 in a "clearance fit" state. Thus, in a use state where the rotating shaft 4 is rotating along with the inner ring 11, creep (slip of the outer ring 12 with respect to the housing 2 in a circumferential direction) may occur between the outer ring 12 and the housing 2. The creep will further be described below.

An inner-ring raceway groove (raceway surface) 11a is formed in an outer peripheral surface of the inner ring 11 such that the balls 13 roll through the inner-ring raceway groove 11a. An outer-ring raceway groove (raceway surface) 12a is formed in an inner peripheral surface of the inner ring 11 such that the balls 13 roll through the outer-ring raceway groove 12a. The balls 13 are provided in an annular space 15 between the inner ring 11 and the outer ring 12. Rotation of the rolling bearing 7 (rotation of the inner ring 11) allows the balls 13 to roll through the inner-ring raceway groove 11a and the outer-ring raceway groove 12a while being held by the cage 14.

The cage 14 holds the balls 13 at predetermined intervals (regular intervals) along the circumferential direction. The cage 14 has a plurality of pockets 18 formed along the circumferential direction and in which the balls 13 are housed. The cage 14 of the present embodiment has a circular ring portion 14a and a plurality of cage bars 14b. The circular ring portion 14a is provided on one side of the balls 13 in the axial direction. The cage bars 14b extend from the circular ring portion 14a toward the other side in the axial direction. Each of the pockets 18 is arranged on the other side (in FIG. 2, on the left side) of the circular ring portion 14a and between the cage bars 14b, 14b adjacent to each other. The cage 14 may be in any other form, and for example, the circular ring portion may also be provided on the other side of the balls 13 in the axial direction.

In the rolling bearing 7 in the present embodiment, the outer ring 12, which is a fixed ring, is attached to the housing 2 (mating member). An outer peripheral surface of the outer ring 12 corresponds to a fitting surface 22 for the housing 2 (inner peripheral surface 3). As depicted in FIG. 2, an annular groove 32 is formed in the fitting surface 22. The annular groove 32 is a circumferentially continuous annular groove. The annular groove 32 is formed in a central portion of the fitting surface 22 in the axial direction. A position radially outward of a contact point of the ball 13 that contacts the outer-ring raceway groove 12a coincides with the center of the annular groove 32 in the axial direction.

Now, creep will be described which may occur between the housing 2 and the outer ring 12. The following three types of creep may occur in the rolling bearing 7. A bearing rotating direction described below is, in the present embodiment, a rotating direction of the inner ring 11, which is a rotating ring.

First creep: creep in which the outer ring 12 slips slowly in the same direction as the bearing rotating direction Second creep: creep in which the outer ring 12 slips quickly in the same direction as the bearing rotating direction Third creep: creep in which the outer ring 12 slips in a direction opposite to the bearing rotating direction The first creep is likely to occur when a heavy load is imposed on the rolling bearing 7 in the radial direction. The first creep is expected to occur in accordance with the following mechanism. That is, if a heavy load is imposed on the rolling bearing 7 in the radial direction, when the balls 13 pass through the outer-ring raceway groove 12a under the high load, the outer peripheral side of the outer ring, which is located immediately below the outer-ring raceway groove 12a, is partly elastically deformed. Since the balls 13 move along the outer-ring raceway groove 12a, the outer ring 12 is subjected to pulsating deformation (displacement). Thus, relative slip results from elastic deformation of a contact area between the outer ring 12 and the housing 2, and is expected to cause the first creep.

The second creep is the same as the first creep in the moving direction (slip direction) of the outer ring 12. However, the second creep is likely to occur when no load is imposed on the rolling bearing 7 in the radial direction. In other words, the second creep is expected to result from rotation of the outer ring 12 in conjunction with rotation of the inner ring 11 when no load is imposed in the radial direction.

In the third creep, the outer ring 12 moves (slips) in the direction opposite to the moving (slip) direction in the first and second creeps. The third creep is expected to result from whirling of the outer ring 12 along the housing inner peripheral surface 3 caused by an unbalanced load in the radial direction.

In the rolling bearing 7 in the present embodiment, the annular groove 32 is formed in the fitting surface 22 of the outer ring 12 and radially outward of the outer-ring raceway groove 12a in order to suppress the first creep. The annular groove 32 depicted in FIG. 2 has a groove width X0 larger than a width Y of the outer-ring raceway groove 12a in the axial direction. However, the annular groove 32 may have a groove width X0 equal to or smaller than the width Y of the outer-ring raceway groove 12a in the axial direction.

The annular groove 32 is formed in the fitting surface 22 of the outer ring 12, which is fitted on the housing 2. This allows restraint of the relative slip caused by elastic deformation as described above in connection with the generating mechanism of the first creep, enabling the first creep to be suppressed. In other words, when a heavy load is imposed on the rolling bearing 7 in the radial direction, an area of the outer ring 12 located radially outward of the outer-ring raceway groove 12a is elastically deformed outward in the radial direction (the diameter of the outer ring 12 is expanded). However, the annular groove 32 formed in this area allows the elastic deformation (diameter expansion) to occur mainly within the range of the annular groove 32. Thus, the effect of the direct contact between the elastically deformed portion and the housing inner peripheral surface 3 can be reduced. As a result, no elastic deformation is transmitted to the housing 2, or the mating member, suppressing possible first creep between the outer ring 12 and the housing 2. As described above, the annular groove 32 serves as a groove (clearance groove) for suppression of the first creep.

Formation of the annular groove 32 as described above provides the outer ring 12 with cylindrical portions 36, 37 on the opposite sides of the annular groove 32 in the axial direction. Outer peripheral surfaces 36*a*, 37*a* of the cylindrical portions 36, 37 are cylindrical surfaces centered around a bearing center line C0 of the rolling bearing 7 and can come into contact with the housing 2 (inner peripheral surface 3) along the housing 2. As depicted in FIG. 2, in a section including the bearing center line C0, the outer peripheral surfaces 36*a*, 37*a* of the cylindrical portions 36, 37 each have a linear sectional shape parallel to the bearing center line C0.

A specific configuration of the annular groove 32 will be described below. In the embodiment depicted in FIG. 2, the annular groove 32 has a groove bottom portion 33 and a pair of groove side portions. The groove side portions form a pair of tapered surface portions 34, 35. The groove bottom portion 33 has a cylindrical surface shape centered around the bearing center line C0. The tapered surface portions 34, 35 extend from opposite ends 33*a*, 33*b* of the groove bottom portion 33 in the axial direction toward the outer peripheral surfaces 36*a*, 37*a* of the cylindrical portions 36 and 37, respectively. The tapered surface portions 34, 35 make the groove width of the annular groove 32 larger toward the fitting surface 22 (namely, toward the outside in the radial direction). In FIG. 2, the groove width (the width dimension in the axial direction) of the annular groove 32 at the outermost position in the radial direction is denoted by X0.

In a section including the bearing center line C0, the tapered surface portion 35 on one side in the axial direction has a linear sectional shape extending from the end 33*b* of the groove bottom portion 33 toward the fitting surface 22 (outer peripheral surface 37*a*) and inclined to the fitting surface 22 (outer peripheral surface 37*a*). The tapered surface portion 34 on the other side in the axial direction has a linear sectional shape extending from the end 33*a* of the groove bottom portion 33 toward the fitting surface 22 (outer peripheral surface 36*a*) and inclined to the fitting surface 22 (outer peripheral surface 36*a*). In the present embodiment, the tapered surface portion 35 on one side in the axial direction and the tapered surface portion 34 on the other side in the axial direction have a laterally symmetric shape in FIG. 2.

In the section depicted in FIG. 2, an angle θ1 between the fitting surface 22 (outer peripheral surface 37*a*) and an extending virtual line 35*a* of the linear tapered surface portion 35 on one side in the axial direction is set to 5° to 45° (5° or more and 45° or less). Similarly, an angle θ2 between the fitting surface 22 (outer peripheral surface 36*a*) and an extending virtual line 34*a* of the linear tapered surface portion 34 on the other side in the axial direction is set to 5° to 45°.

Instead of 45°, the upper limit value of the angles θ1 and θ2 may be set to 30° or 15°. Instead of 5°, the lower limit value of the angles θ1 and θ2 may be set to 8°. In FIG. 2, to facilitate easy understanding of the sectional shape of the annular groove 32, the angles θ1 and θ2 and the depth h are depicted larger than in reality.

The annular groove 32 may be formed by bringing a grinding wheel 60 (see FIG. 3A) into contact with the outer peripheral surface of the outer ring 12. Thus, the grinding wheel 60 may have a protruding shape that matches the groove bottom portion 33 and the tapered surface portions 34 and 35. Then, the annular groove 32 can be easily formed. Polishing of the outer peripheral surfaces 36*a*, 37*a* of the cylindrical portions 36, 37 may be finished before formation of the annular groove 32.

Figure 4:
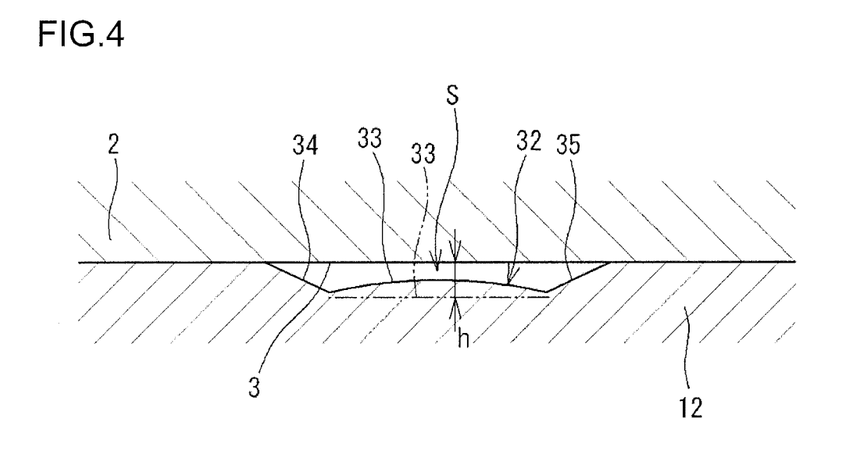
FIG. 4 is an enlarged sectional view of an outer ring and a housing in a state where a static load rating is imposed on the rolling bearing.

As described above (see FIG. 2), even when the annular groove 32 is formed in the outer ring 12, the outer ring 12 may be elastically deformed during the actual use of the rolling bearing 7, bringing a part of the groove bottom portion 33 into contact with the housing (inner peripheral surface 3). In this case, a change (pulsation) in the state of the contact may cause the first creep. Thus, the rolling bearing 7 in the present embodiment is designed such that the depth h of the annular groove 32 has a value at which the groove bottom portion 33 is precluded from coming into contact with the housing 2 (inner peripheral surface 3) even when a static load rating (basic static load rating) is imposed on the rolling bearing 7 in the radial direction, as depicted in FIG. 4. In other words, when the static load rating is imposed on the rolling bearing 7 to elastically deform a part of the outer ring 12, a clearance S is formed between the groove bottom portion 33 and the inner peripheral surface 3 of the housing 2. Consequently, the groove bottom portion 33 is not in contact with the inner peripheral surface 3 of the housing 2. During actual use, the rolling bearing 7 is often used under the condition that the rolling bearing 7 is subjected to a dynamic load that is a radial load equal to or smaller than the static load rating. Consequently, the above-described configuration enables possible first creep to be more effectively suppressed during actual use. FIG. 4 is an enlarged sectional view of the outer ring 12 and the housing 2 in the case where the static load rating is imposed on the rolling bearing 7. In FIG. 4, a continuous line represents the annular groove 32 elastically deformed by the action of the static load rating, whereas a long dashed double-short dashed line represents the annular groove 32 on which no load is imposed. The static load rating is a "basic static radial load rating" in JIS B 1519:2009.

The depth h of the annular groove 32 is a depth based on the fitting surface 22 (outer peripheral surfaces 36*a*, 37*a*). The static load rating varies with the bearing number, and thus, the depth h of the annular groove 32 varies with the bearing number. The depth h may be, for example, less than 0.1 mm.

An excessively large depth of the annular groove 32 may reduce strength and rigidity of the outer ring 12. Thus, the annular groove 32 has a depth h at which the groove bottom portion 33 can come into contact with the housing 2 when a radial load that is heavier than the static load rating is imposed on the rolling bearing 7. With the depth h of the annular groove 32 set as described above, when a radial load that is heavier than the static load rating is imposed on the rolling bearing 7, a part of the groove bottom portion 33 comes into contact with the housing 2. As a result, the heavy load can be transmitted to the housing 2.

In the rolling bearing 7 depicted in FIG. 2, the annular groove 32 has the tapered surface portions 34, 35 each having a linear sectional shape. Thus, crossing portions 39*a*, 39*b* between the annular groove 32 (tapered surface portions 34, 35) and the fitting surface 22 (outer peripheral surfaces 36*a*, 37*a*) form a large obtuse angle instead of forming a pointed shape (for example, a pointed shape forming a right angle). This allows prevention of a locally high contact surface pressure on the housing 2 resulting from the contact between the housing 2 and each of the crossing portions 39a, 39b. As a result, even when creep occurs in the outer ring 12, wear is less likely to progress.

When the annular groove 32 is formed using the grinding wheel 60 (see FIG. 3A), the annular groove 32 formed has, on the opposite sides of the groove bottom portion 33 in the axial direction, the tapered surface portions 34, 35 each having a linear sectional shape. Thus, even with a slight variation in the cutting depth E0 of the grinding wheel 60, the dimensional accuracy of the groove width X0 of the annular groove 32 can be made less likely to be affected by the variation. Thus, a dimensional variation in the groove width X0 of the annular groove 32 can be suppressed. The effect enabling suppression of such a variation will be described below.

Figure 3A:
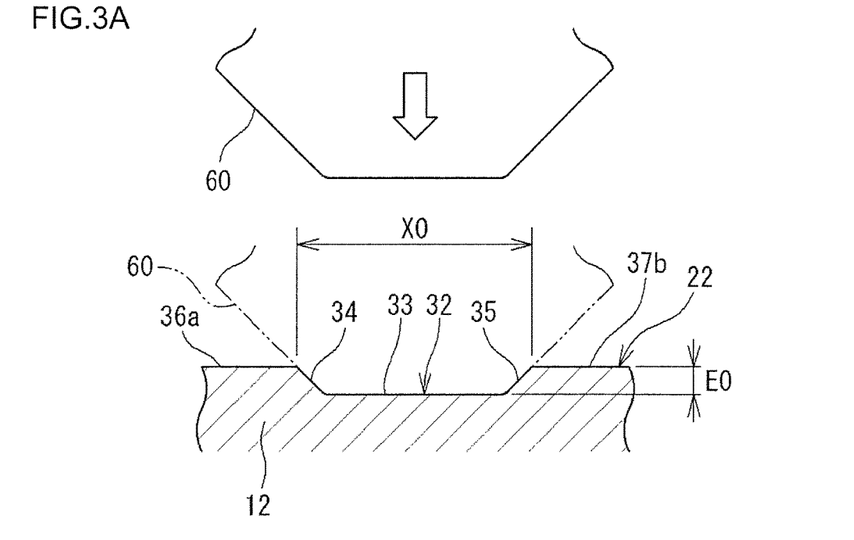
FIGS. 3A, 3B and 3C are diagrams illustrating an annular groove and formation thereof.
Figure 3B:
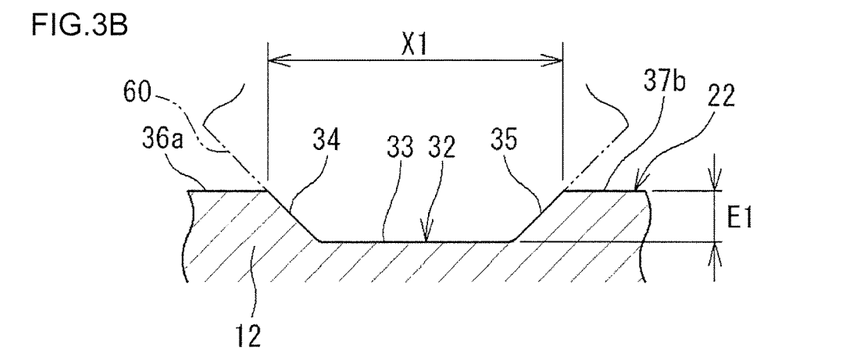
Figure 3C:
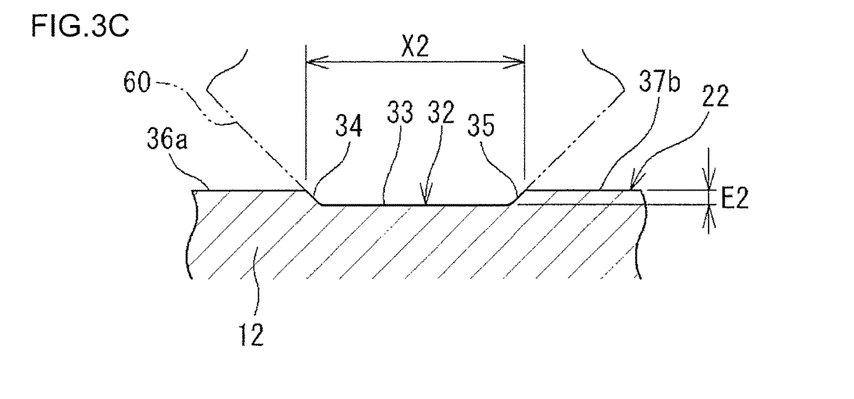

The annular groove 93 is formed, as depicted in FIG. 3A, by moving the grinding wheel 60 closer to the outer peripheral surface (fitting surface 22) of the outer ring 12 and further bringing the grinding wheel 60 into contact with the outer peripheral surface as depicted by a long dashed double-short dashed line. FIG. 3A illustrates that the desired annular groove 32 (having design values) is formed. The cutting depth of the grinding wheel 60 has the set value E0, and in this case, the desired groove width X0 (having the design values) is formed. In contrast, FIG. 3B illustrates that the cutting depth E1 of the grinding wheel 60 with respect to the outer ring 12 is larger than the set value E0 (see FIG. 3A). In this case, the groove width X1 of the annular groove 32 formed is slightly larger than the specified groove width X0. However, the difference (X1−X0) is small. FIG. 3C illustrates that the cutting depth E2 of the grinding wheel 60 is smaller than the set value E0 (see FIG. 3A). In this case, the groove width X2 of the annular groove 32 formed is slightly smaller than the specified groove width X0. However, the difference (X0−X2) is small.

As described above, the annular groove 32 in the form depicted in FIG. 2 has the tapered surface portions 34, 35 each having a linear sectional shape. Consequently, even with a variation (E1, E2) in the cutting depth E0 of the grinding wheel 60, the dimension of the groove width X0 of the annular groove 32 can be made less likely to be affected by the variation. The present embodiment thus allows dimensional management and production management of the annular groove 32 to be relatively easily achieved. As a result, the groove width X0 of the annular groove 32 is easily made closer to the design value, allowing the creep suppression effect to be appropriately exerted using the annular groove 32. This also allows suppression of an elevated surface pressure on the housing 2 resulting from the contact between the crossing portions 39a, 39b (see FIG. 2) and the housing 2. The rolling bearing 7 enables suppression of a variation in the dimension of the groove width X0 of the annular groove 32 and is thus suitable for mass production.

Figure 5:
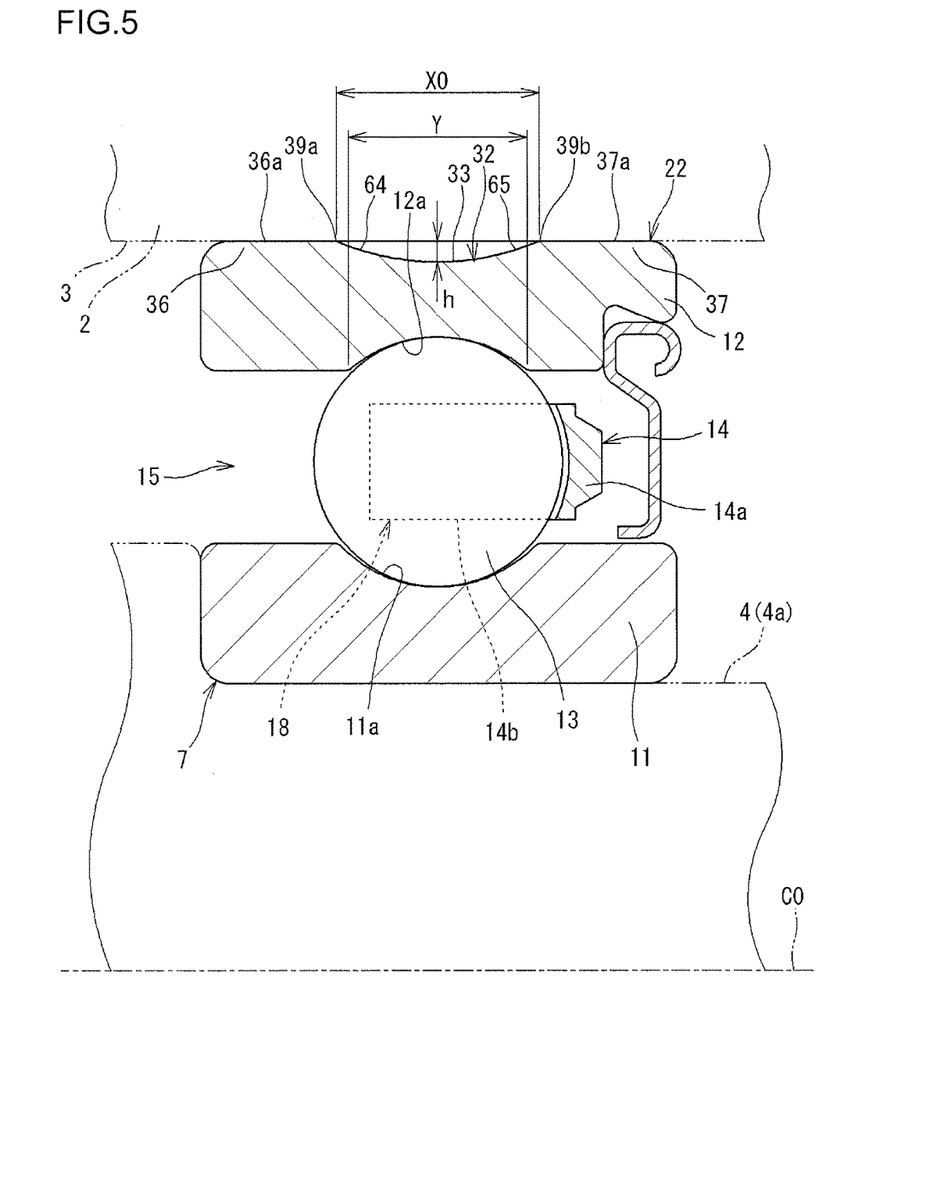
FIG. 5 is a sectional view of a rolling bearing in which an annular groove in a different form is formed in the outer ring.

FIG. 5 is a sectional view of the rolling bearing 7 in which the annular groove 32 in a different form is formed in the outer ring 12. The rolling bearing 7 depicted in FIG. 5 is different from the rolling bearing 7 depicted in FIG. 2 in the shape of the annular groove 32. However, the rolling bearings 7 depicted in FIG. 2 and FIG. 5 are otherwise the same, and the respects in which the rolling bearings 7 depicted in FIG. 2 and FIG. 5 are the same will not be described.

The annular groove 32 depicted in FIG. 5 has the groove bottom portion 33 and a pair of groove side portions 64, 65. The groove bottom portion 33 and the groove side portions 64, 65 are all shaped like circular arcs. That is, the annular groove 32 is formed of a groove with a circular arc-shaped section. A groove width X0 of the annular groove 32 is much larger than the depth h. As is the case with the annular groove 32 depicted in FIG. 2, the depth h of the annular groove 32 depicted in FIG. 5 is such that the groove bottom portion 33 is precluded from coming into contact with the housing 2 (inner peripheral surface 3) even when a static load rating (basic static load rating) is imposed on the rolling bearing 7 in the radial direction. In other words, when the static load rating is imposed on the rolling bearing 7 to elastically deform a part of the outer ring 12, a clearance S is formed between the groove bottom portion 33 and the inner peripheral surface 3 of the housing 2. Consequently, the groove bottom portion 33 is not in contact with the inner peripheral surface 3 of the housing 2. Thus, possible first creep can be effectively suppressed during actual use.

In the annular groove 32 depicted in FIG. 5, the crossing portions 39a, 39b between the annular groove 32 (tapered surface portions 64, 65) and the fitting surface 22 (outer peripheral surfaces 36a, 37a) form a large obtuse angle instead of forming a pointed shape (for example, a pointed shape forming a right angle). This allows prevention of a locally high contact surface pressure on the housing 2 resulting from the contact between the housing 2 and each of the crossing portions 39a, 39b. As a result, even when creep occurs in the outer ring 12, wear is less likely to progress.

Figure 6:
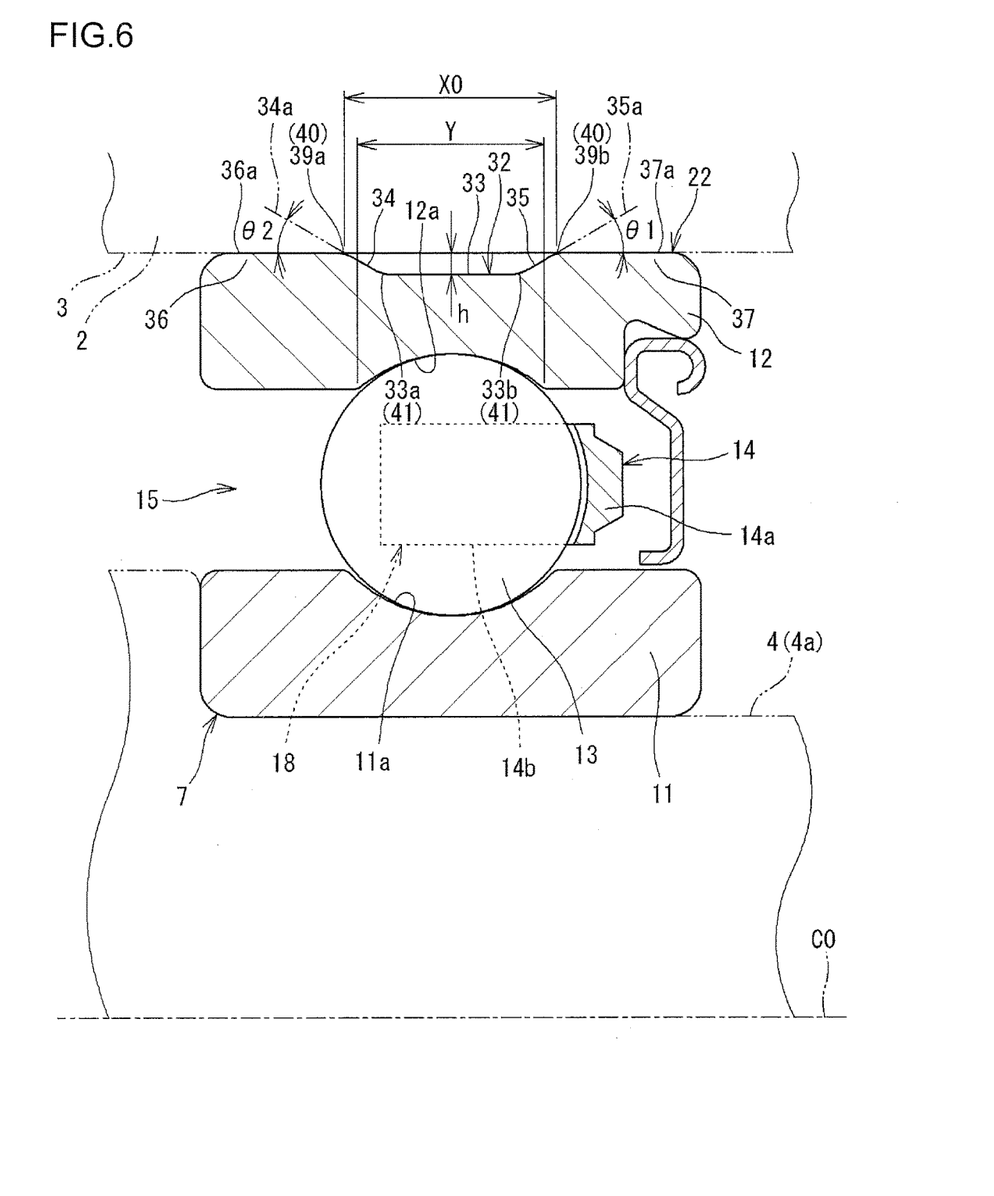
FIG. 6 is a sectional view illustrating a variation of the rolling bearing depicted in FIG. 2.

FIG. 6 is a sectional view illustrating a variation of the rolling bearing 7 depicted in FIG. 2. In the embodiment depicted in FIG. 6, a curved surface 40 shaped like a protruding curve is formed at a boundary between each of the tapered surface portions 34, 35, corresponding to the groove side portions of the annular groove 32, and the fitting surface 22 (each of the outer peripheral surfaces 36a, 37a), in other words, at the crossing portion 39a (39b) between the tapered surface portion 34 (35) and the outer peripheral surface 36a (37a).

In this case, the outer ring 12 does not come into contact with the housing 2 at the annular groove 32 but in the remaining areas of outer ring 12 (in the outer peripheral surfaces 36a, 37a). Thus, the curved surface 40 shaped like a protruding curve is formed at the crossing portion 39a (39b). Consequently, the crossing portion 39a (39b) and the housing 2 come into contact with each other. This enables prevention of a local increase in the contact surface pressure acting on the housing 2.

In the embodiment depicted in FIG. 6, the boundary portion between the groove bottom portion 33 and the tapered surface portion 34 (35) continues from the groove bottom portion 33 into the tapered surface portion 34 (35) via a recessed curved surface 41. This prevents the sectional shape from changing sharply at the annular groove 32, allowing prevention of possible stress concentration at the boundary portions. The annular groove 32 depicted in FIG. 6 is formed using a grinding wheel as is the case with FIG. 2. However, formation of the annular groove 32 may be performed simultaneously with grinding of the outer peripheral surfaces 36a, 37a of the cylindrical portions 36, 37. To the embodiment depicted in FIG. 2, the configuration is applicable in which the recessed curved surface 41 is formed at the boundary portion between the groove bottom portion 33 and the tapered surface portion 34 (35) as described above.

Figure 7:
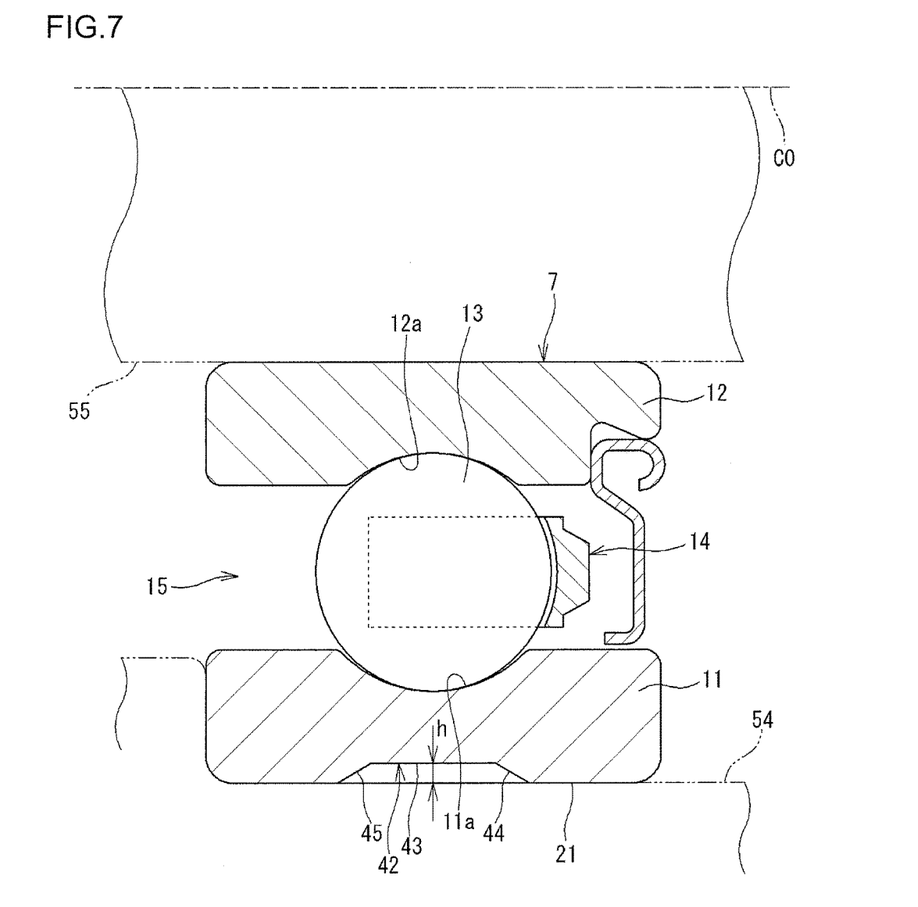
FIG. 7 is a sectional view of a rolling bearing in another embodiment.

In the above-described embodiments, the inner ring 11 is a rotating ring that rotates integrally with a mating member (rotating shaft 4) to which the inner ring 11 is attached. The outer ring 12 is a fixed ring fixed to the mating member (housing 2) (though creeping is possible) to which the outer ring 12 is attached. However, the invention may have any configuration so long as one of the inner ring 11 and the outer ring 12 is a rotating ring, whereas the other is a fixed ring. Unlike the present embodiment, a configuration is possible in which the inner ring 11 attached to a shaft 54 is a fixed ring, whereas the outer ring 12 is a rotating ring that rotates integrally with a housing 55 as depicted in FIG. 7. In this case, the inner ring 11 and the shaft 54 are in a clearance fit state, and the inner ring 11 creeps with respect to the shaft 54. Thus, an annular groove 42 is formed (as is the case with the above-described embodiments) in the fitting surface (inner peripheral surface) 21 of the inner ring 11 that is fitted on the shaft 54 serving as a mating member. The annular groove 42 has a groove bottom portion 43, a pair of tapered surfaces 44, 45, and the depth h at which the groove bottom portion 43 is precluded from coming into contact with the shaft 54 even when a static load rating (basic static load rating) is imposed on the rolling bearing 7 in the radial direction.

During actual use, the rolling bearing 7 is often used under the condition that the rolling bearing 7 is subjected to a dynamic load that is a radial load equal to or smaller than the static load rating. Consequently, the configuration depicted in FIG. 7 enables possible first creep to be more effectively suppressed during actual use. The configurations of the annular groove 32 (the configurations concerning, for example, the angle θ1 and θ2 and the depth h) depicted in FIG. 2, FIG. 5, and FIG. 6 are applicable to the annular groove 42 depicted in FIG. 7.

The embodiments as disclosed above are illustrative in every way and are not restrictive. In other words, the rolling bearing in the invention is not limited to the illustrated forms but may be in any other form within the scope of the invention. For example, in the annular grooves 32 depicted in FIG. 2 and FIG. 6, the groove bottom portion 33 may be a surface shaped like a recessed circular arc.

With reference to FIG. 1, the rolling bearing 7 has been described as a bearing for motors to which a preload is applied. However, the rolling bearing 7 may be used for applications other than motors. The rolling bearing in the invention is applicable to rotating equipment involving the creep problem. The rolling bearing may be an angular ball bearing instead of the deep groove ball bearing. The rolling elements may be other than balls and may be cylindrical rollers or tapered rollers.

In the invention, during actual use, possible creep can be more effectively suppressed.

What is claimed is:

1. A rolling bearing comprising:
an inner ring;
an outer ring;
a plurality of rolling elements interposed between the inner ring and the outer ring; and
a cage that holds the rolling elements, one of the inner ring and the outer ring being a rotating ring, and the other being a fixed ring, wherein
a fitting surface of the fixed ring attached to a mating member is formed as a first partial peripheral surface and a second partial peripheral surface each of which is a surface of the fixed ring facing the mating member in a radial direction, the first partial peripheral surface being arranged on one side in an axial direction, the second partial peripheral surface being arranged on the other side in the axial direction, and an annular groove for creep suppression is formed between the first partial peripheral surface and the second partial peripheral surface, and
a curved surface shaped like a protruding curve is formed at a boundary between the annular groove and the fitting surface.

2. The rolling bearing according to claim 1, wherein the annular groove is a groove with a circular arc-shaped section.

* * * * *